W. N. DENNISON.
BRAKE FOR TALKING MACHINES.
APPLICATION FILED JULY 29, 1911.
1,219,380.
Patented Mar. 13, 1917.
4 SHEETS—SHEET 1.
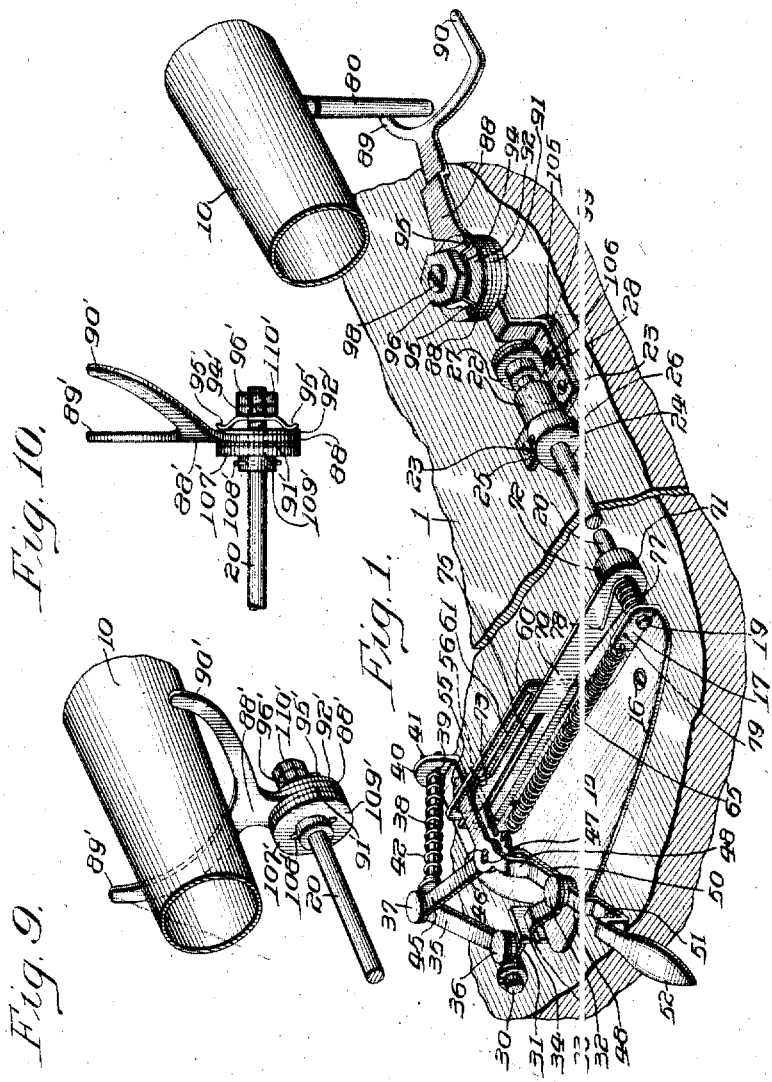
WITNESSES
F. J. Hartman
A. J. Gardner
INVENTOR
Wilburn N. Dennison
BY
Horace Petty
ATTORNEY

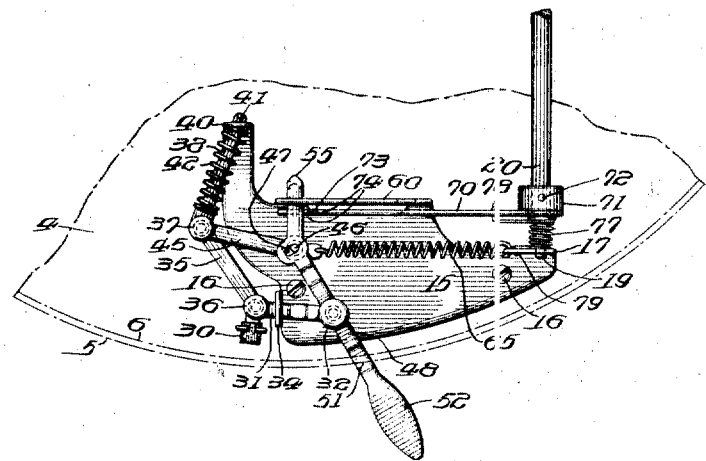
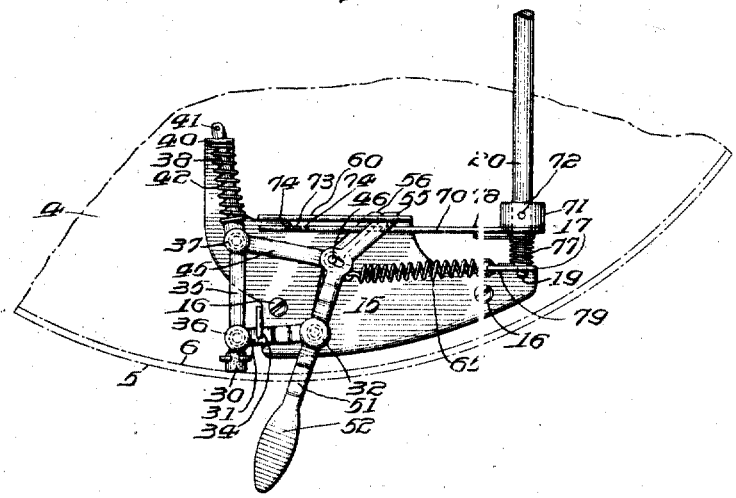

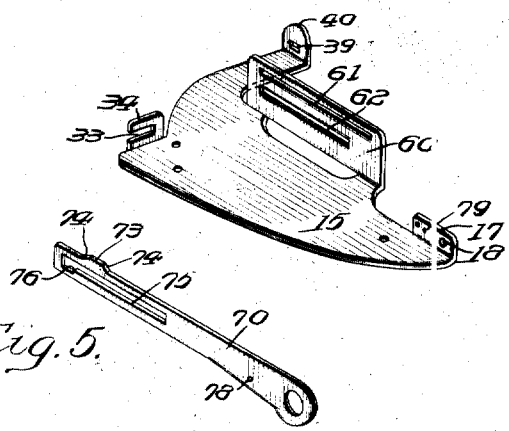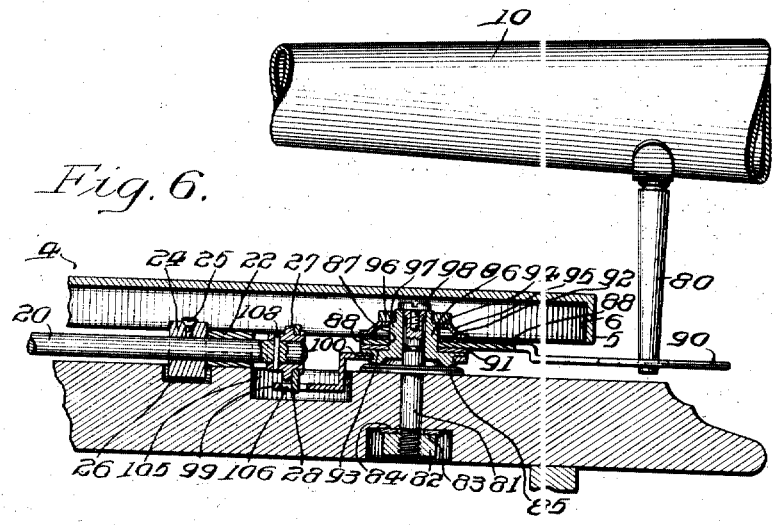

W. N. DENNISON.
BRAKE FOR TALKING MACHINES.
APPLICATION FILED JULY 29, 1911.

1,219,380.

Patented Mar. 13, 1917.
4 SHEETS—SHEET 4.

INVENTOR
Wilburn N. Dennison

WITNESSES

BY

ATTORNEY

UNITED STATES PATENT OFFICE.

WILBURN N. DENNISON, OF MERCHANTVILLE BOROUGH, NEW JERSEY, ASSIGNOR TO VICTOR TALKING MACHINE COMPANY, A CORPORATION OF NEW JERSEY.

BRAKE FOR TALKING-MACHINES.

1,219,380.     Specification of Letters Patent.     Patented Mar. 13, 1917.

Original application filed September 8, 1910, Serial No. 581,022. Divided and this application filed July 29, 1911. Serial No. 641,274.

*To all whom it may concern:*

Be it known that I, WILBURN N. DENNISON, a citizen of the United States, and a resident of the borough of Merchantville, county of Camden, and State of New Jersey, have invented certain new and useful Improvements in Brakes for Talking-Machines, of which the following is a full, clear, and exact disclosure, reference being had to the accompanying drawings, forming a part of this specification, this application being a division of my application, Serial Number 581,022, filed September 8, 1910.

The main objects of this invention are, to provide an improved brake adapted to be used in combination with a talking machine; to provide an improved brake for a talking machine which may be actuated either automatically by the operation of the talking machine, or which may be actuated manually; to provide an improved brake in which the braking action will take place gradually and with gradually increasing force; to provide an improved brake, the main portion of which is adapted to be arranged beneath a turn-table, and which is adapted to engage against the inner surface of an annular downwardly projecting flange provided therefor on the turn-table; and to provide other improvements as will appear hereinafter.

Figure 7:
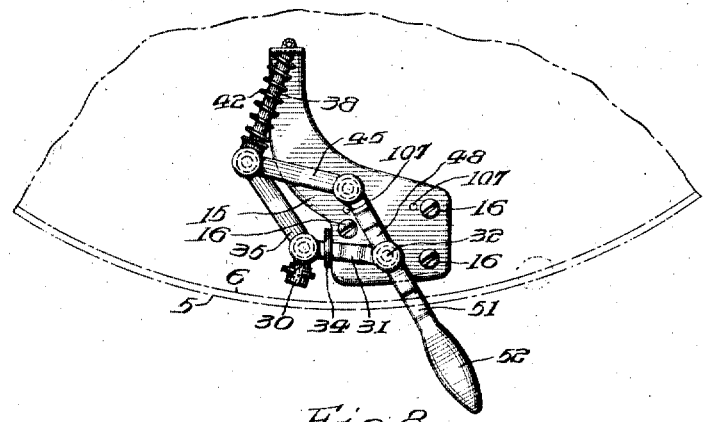
Figure 8:
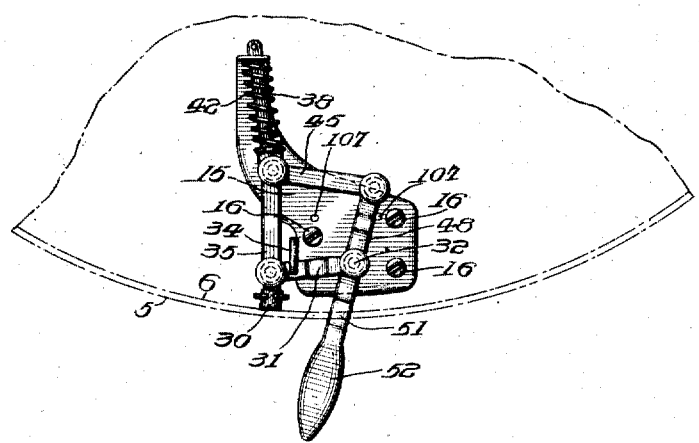

In the drawings, Figure 1 is a fragmentary perspective of a brake constructed in accordance with this invention; Fig. 2 a fragmentary top plan view of the same showing the brake in inoperative position; Fig. 3 a top plan view of the same showing the brake in operative position; Figs. 4 and 5 are perspectives of details of the same; Fig. 6 is a fragmentary side elevation, partly in vertical section, of a portion of the same; Figs. 7 and 8 are fragmentary top plan views showing a modified form of this invention in operative and inoperative position, respectively; and Figs. 9 and 10 are fragmentary views of a modified detail of construction.

Referring to the drawings, one embodiment of this invention is shown applied to a talking machine comprising the usual or any suitable casing or cabinet 1, containing the usual actuating mechanism for rotating the usual flat circular turn-table 4, arranged above the upper side of the casing 1, and provided with a downwardly extending marginal annular flange or rim 5, having a cylindrical inner surface 6, coaxial of the axis of rotation of the turn-table. The talking machine is provided with the usual or any suitable swinging hollow tone arm 10, adapted to coöperate as usual with a record mounted upon the turn-table.

Arranged beneath the turn-table 4, and within the marginal flange 5 thereof, is a plate 15, which forms a base or support for some of the movable portions of this improved brake. This plate is detachably secured to the upper surface of the upper side of the motor casing 1 by screws 16 or by other suitable means, and has an upwardly projecting ear 17 at one end, provided with a circular aperture 18 forming a bearing for a reduced end 19 of a rock-shaft 20, the shoulder between this reduced end and the main portion of the shaft being in engagement with the inner surface of the ear 17, to prevent movement of the shaft longitudinally toward the ear. The shaft 20 preferably extends rearwardly obliquely of the casing 1 and parallel to the upper surface of the casing, the rear portion of the shaft being rotatably supported in a bearing 22, arranged beneath the turn-table, and detachably connected to the upper side of the casing by screws 23, through suitable means. To prevent longitudinal movement of the shaft 20 rearwardly, a collar 24 is adjustably secured to the shaft by means of a set screw 25, the collar being arranged to bear against the front end of the bearing 22, a recess 26 being provided in the upper side of the casing beneath the collar, in which the collar is freely rotatable. On the rear end of the shaft 20, and in the rear of the bearing 22, is rigidly secured a collar 27, having projecting rearwardly downwardly therefrom and rigid therewith, a stud 28 forming a crank whereby the shaft 20 may be rotated automatically by means to be hereinafter described, the upper side of the casing being provided with a suitable recess.

A brake-shoe or pad 30 is located beneath the turn-table and adjacent the internal surface of the rim 5 of the turn-table 4. This brake-shoe 30 is mounted upon the free end of one branch of an angular arm or bell crank lever 31, the other branch of which is pivoted adjacent its outer end to the base 15 of the brake upon a vertical stud 32, this latter branch of the lever being mounted to slide horizontally about its pivot in a horizontal slot 33, formed in the forward edge of an upturned portion 34 of the base 15, the walls of the slot 33 forming a guide for the arm as it oscillates.

To oscillate the brake-pad 30 in a horizontal plane about its pivot 32, to throw it into and out of engagement with the internal cylindrical surface 6 of the rim 5 of the turn-table, a flat link 35 is pivoted at one end to the arm 31, adjacent its vertex in the rear of the pad 30 by a vertical headed pintle 36, and at its other end to a laterally movable vertical pintle 37, to which is also pivoted one end of a flat link 38, the other end of which extends rearwardly and is loosely and slidably mounted in a horizontal slot 39, of an upturned portion or bearing 40, of the base 15. The rear end of the latter link 38 is provided with a pin 41 in the rear of its bearing 40, and between the bearing 40 and the pintle 37, this link is surrounded by a compressed spiral spring 42, which normally forces this link forwardly and keeps the pin 41 at the rear end of the link, always in engagement with the rear surface of the bearing 40.

The two links 35 and 38, and their connecting pintle 37, are combined in the form of a toggle joint which is actuated by an intermediate link 45, one end of which is pivoted upon the pintle 37 and the other end of which extends inwardly and is provided with a stud 46, rigid therewith, which projects above and below this link. The upper end of the stud 46 engages loosely in an oblong slot 47 of a hand-lever 48, which is pivoted intermediate of its ends on the vertical stud 32, which is rigid with the base 15 of the brake, and to which the brake-pad 30 is also pivoted, as hereinbefore described. The lower end of the stud 46 engages snugly but rotatively in an aperture provided therefor in a secondary lever 50, intermediate the ends thereof. One end of this secondary lever is pivoted below the hand-lever 48 upon the stud 32, upon which the hand-lever is mounted to oscillate. This secondary lever 50 is thus movable independently of the hand-lever 48, through a distance equal to the free movement of the upper end of the stud 46, in the oblong slot 47 of the hand-lever. The outer portion of the hand-lever 48 is looped downwardly, as at 51, freely below the under edge of the rim 5 of the turn-table, to permit the free movement of the lever, and then projects outwardly in the form of a handle 52.

For guiding the inner end 55 of the hand-lever and the inner end 56 of the secondary lever to move in parallel horizontal planes, the inner portion of the base plate 15 is bent upwardly into a plane at right angles to the rock-shaft 20, forming a guide standard 60 which is provided with two oblong parallel horizontal slots 61 and 62, the upper one 61 of which has a width equal to the thickness of the inner end 55 of the hand-lever, and the lower one 62 of which has a width equal to the thickness of the inner end 56 of the secondary lever. The outer ends of these slots terminate in substantially the same vertical planes, and the slots are of sufficient length to permit of the necessary movements of the levers.

For automatically swinging the brake-shoe 30 into an operative position from an inoperative position, a spiral spring or other yielding member 65 is connected at one end to the secondary lever 50 intermediate of its ends, and at its other end to the upturned portion 17 of the base plate 15. This yielding member 65 is preferably maintained at all times under a tension tending to elongate the same, and tends to draw the free end of the secondary lever rearwardly to actuate through the link 45 and pintle 37, the two links 35 and 38 of the toggle joint controlling the movement of the brake-pad 30.

For holding the brake-shoe 30 in inoperative position, a catch is provided which comprises an oblong flat crank-arm 70, arranged upon the inside of and in sliding contact with the upturned portion 60 of the base 15. The inner end of this catch 70 is provided with a hub or collar 71, rigid therewith, surrounding the rock-shaft 20 and detachably fixed thereon by a pin 72 extending through the collar. This catch-plate 70 is provided upon its upper edge, adjacent its outer or free end, with an upwardly projecting lug 73, the outer and inner edges 74 of which converge upwardly and normally project into the path of the inner end of the hand-lever 48. This catch-plate is also provided in its outer portion with an oblong slot 75, extending longitudinally of the plate. The inner portion of this slot 75 is substantially the same width as the thickness of the free end of the secondary lever 50, and the lower wall of this slot is recessed adjacent the outer end of the slot, to receive the free end of the secondary lever 50, and to provide an abrupt outwardly facing substantially vertical shoulder 76, adapted to hold the free end of the secondary lever 50 against movement when the brake is set in its inoperative position. The free end of the catch-plate 70 is normally forced upwardly by means of a spiral spring 77, surrounding the rock-shaft 20 between the catch-plate 70 and the front bearing 18 of the rock-shaft, one end of the spring 77 being secured in an aperture 78 provided therefor in the catch-plate 70, and the other end of the spring being secured in an aperture 79 provided therefor in the upturned portion 17 of the base 15.

The outer inclined edge wall 74 of the lug 73 intersects the upper edge wall of the catch-plate 70 in a line substantially in vertical alinement with the shoulder 76 formed by the recessed portion of the slot 75 in the plate, and the proportions and arrangement of the slot 75 and its recess, and the proportions of the secondary lever 50, hand-lever 48 and oblong slot 47 of the hand-lever are such that the inner free end 55 of the hand-lever may be brought into a position upon the upper edge of the catch-plate 70, between the lug 73 and the forward end of the plate, and when in this position the inner end 56 of the secondary lever will be brought into position in the recess in front of and against the shoulder 76 of the slot 75 of the plate. The oblong slot 47 of the hand-lever permits the inner end of the hand-lever to be oscillated inwardly against the adjacent inclined wall 74 of the lug 73 of the catch-plate, and to be brought into position upon the top wall of the lug, forcing the catch-plate downwardly with respect to the secondary lever 50, and releasing the inner free end of the secondary lever from engagement with the shoulder 76, whereupon the free end of the secondary lever will be drawn inwardly toward the rock-shaft 20 in the slot 75 of the catch-plate and into engagement with the inner end wall of the slot, which limits the inward movement of the secondary lever. This movement of the secondary lever takes up the lost motion between the secondary lever and the hand-lever and carries the free end of the hand-lever rearwardly to the inner end of the slot 61 in the guide standard 60.

From the above description it is evident that when it is desired to release the brake from the turn-table to start the talking machine, or, in other words, when it is desired to set the brake in an inoperative position, the handle 52 of the hand-lever 48 is forced manually inwardly or toward the rock-shaft 20. This inward movement of the handle 52 takes up the lost motion between the hand-lever and the stud 46 of the intermediate link 45, and this link is moved outwardly, moving the pintle 36 of the toggle joint outwardly against the action of the spring 65, and swinging the brake-shoe 30 inwardly and into inoperative position. During this movement of the hand-lever, the catch-plate 70 is held in its lowermost position by the free end of the secondary lever 50 sliding against the lower wall of the slot 75 of the catch-plate, and the upper edge of the lug 73 of the catch-plate is maintained below the lower wall of the slot 61 of the guide standard 60, until the free end of the secondary lever passes in front of and clears the shoulder 76 of the catch-plate, whereupon the free end of the catch-plate is automatically lifted by means of the spring 77, and the brake is thus automatically located in the inoperative position, as shown in Figs. 2 and 3. When the brake is thus set in its inoperative position, it may be released either manually, by moving the hand-lever 48, or automatically, as will be described hereinafter.

For manually releasing the brake, the handle 52 of the hand-lever 48 is moved outwardly or away from the rock-shaft 20, whereupon the inner end 55 of the hand-lever will act upon the inclined shoulder 74 of the catch-plate and force it downwardly, thus releasing the inner end 56 of the secondary lever from engagement with the abrupt shoulder 76 of the catch-plate, whereupon the inner end of the secondary lever will be drawn toward the rock-shaft 20 by the spring 65, taking up the lost motion between the secondary lever and the hand-lever, and moving the hand-lever with the secondary lever.

This movement of the secondary lever is transmitted through the link 45 to the pintle 37 of the toggle joint, and through the toggle joint to the brake-pad 30, which is thus moved outwardly away from the axis of the turn-table and into engagement with the inner surface of its rim. The brake-pad is thus brought into engagement with the rim of the turn-table, before the secondary lever has completed its movement and before the pintle 37 of the toggle joint has been brought to its dead center or into alinement with the outer ends of the links 35 and 38 of the joint.

The brake-pad having thus been brought into engagement with the rim of the turn-table, the secondary lever continues its movement under the action of the spring until the free end of the secondary lever is brought to a stop against the end wall of the slot in the catch-plate. This additional movement of the secondary lever after the initial engagement of the brake-pad compresses the spiral spring 42, surrounding the rear link 38 of the toggle joint, and forces the free end of this link rearwardly through its bearing 39 in the plate 40, as shown in Fig. 3, thus gradually applying the pressure of the friction pad upon the rim of the turn-table.

For automatically applying the brake after it has been manually set in an inoperative position, as heretofore described, any suitable means may be employed adapted to be actuated by a movable part of the talking machine, to rotate the rock-shaft 20, when desired, to swing the free end of the catch 70 downwardly a sufficient distance to release the inner end 56 of the secondary lever. One embodiment of such means comprises, as shown in the drawings, a vertical stud 80, rigidly secured at its upper end to the under side of the tone arm 10, and terminating at its lower end in the rear of the turn-table and in proximity to the upper surface of the top of the motor casing of the talking machine.

Arranged between this stud 80 and the collar 27 at the rear end of the rock-shaft 20, is a vertical pivot 81, which projects upwardly from the top of the motor casing and is rigidly secured thereto in any suitable manner; for instance, by having its lower portion extend through the top, and having a nut 82 threaded upon the lower end of the pivot and engaging against a washer 83 interposed between the nut and a counterbored seat 84 in the under side of the top, the pivot being also provided with a flat circular washer 85, rigidly secured thereto, concentric therewith, and bearing against the upper surface of the top of the casing.

Snugly, but rotatably, mounted upon the upper portion of the pivot 81 is a sleeve 86, the lower face of which bears against the upper face of the washer 85. The upper portion of this sleeve is reduced in diameter to form a cylindrical bearing 87, coaxial with the pivot. Upon this bearing 87 is rotatively mounted one end of a substantial flat horizontal arm 88, which extends rearwardly from the pivot 81, and the outer end of which is bifurcated to form two fingers 89 and 90, forming a horizontal yoke which may be arranged in the path of and to embrace the lower end of the stud 80 of the tone-arm. This flat-arm is frictionally and adjustably retained in any desired position of rotation with respect to the pivot 81 by means of two friction washers 91 and 92, made of fiber or leather, or other suitable material. One of these washers surrounds the sleeve 86, between the arm and the flat annular shoulder 93, formed between the lower portion and the upper reduced portion of the sleeve, and the other surrounds the reduced portion of the sleeve and is in engagement with the upper side of the arm.

The arm 88 is yieldingly pressed between these two washers 91, 92, by means of a yielding spider 94, made of tempered steel or other suitable material, the arms 95 of which engage against the upper friction washer 92. The spider is adjustably held in engagement with the upper friction washer, by means of a nut 96, which is threaded upon the upper end of the sleeve 86, the upper end being preferably reduced for this purpose to provide an annular shoulder 97 between the threaded portion and the main portion of the sleeve, against which the nut may be tightly clamped. The sleeve 86 is detachably held against upward movement by a cap-screw 98, threaded into the upper end of the pivot, the head of the screw being clamped tightly against the end of the pivot and overlapping loosely the upper end of the sleeve, the sleeve preferably having a slight amount of end movement between the head of the screw 98 and the washer 85.

For transmitting the rotary movement of the sleeve 86 to the rock-shaft 20, an offset arm 99 is rigidly secured at one end to the lower end of the sleeve 86, in an annular recess 100 provided therefor. The free end of this offset crank-arm is freely movable in a recess 105 provided therefor in the upper side of the top of the motor casing, and this free end is provided with an oblong slot 106, in which loosely engages the stud 28, rigid with the collar 27 of the rock-shaft 20.

By this construction the arm 88, carrying the fingers 89 and 90, is connected to the sleeve 86 with sufficient pressure to release the brake, through the action of the arm 99 and stud 28, without moving the yoke or fingers 89 and 90 with respect to the sleeve 86. The arm 88, however, may be easily and quickly moved into any desired position of adjustment with respect to the sleeve 86, by applying a pressure to its free end slightly in excess of the amount of pressure needed to release the brake from its catch. The arm may thus be adjusted so that the stud 80 will be brought into engagement with the inner finger 89 of the arm at any desired point in the movement of the tone arm 10, to apply the brake automatically, and the adjustment may obviously be made so that when the tone arm has reached the end of its path in playing any record, the machine will be automatically stopped.

In the operation of this automatic brake, the lower end of the stud 80 of the tone arm is located in the yoke between the fingers 89 and 90, and moves freely between these fingers in its path across the record. After the brake has been applied by the engagement of the stud 8 with the finger 89, as heretofore described, the tone arm may then be swung freely outwardly to bring it into a starting position, and by a further outward movement the stud 80 may be brought into engagement with the outer finger 90 of the arm 88, to effect an outward adjustment of the arm with respect to its sleeve 86. The arm may thus be adjusted either inwardly or outwardly by the movement of the tone arm.

The stopping mechanism may be set in two ways. The first is by swinging the tone arm 10 outwardly beyond the record until the stud 80 engages the finger 90 and consequently moves the inner finger 89 to a position in which it must be engaged by the stud 80, when the tone arm 10 is swung inwardly, before the stylus is in alinement with the innermost convolution. The tone arm 10 is then swung inwardly until the stylus is in alinement with the innermost convolution of the record, whereupon the stud 80 will engage the finger 89 and turn the lever 88 upon its pivot, such motion being permitted by reason of the friction between the two arms 88 and 99. When the stylus is in alinement with the inner convolution of the record, the finger 89 will have been automatically adjusted to stopping position. The tone arm is then swung outwardly until the stylus is in alinement with the outermost convolution of the record and in coming to such position the stud 80 will not have engaged the finger 90. The lever 52 is then operated to move the brake 30 in to the position shown in Fig. 1 and the stylus placed in the outer end of the groove. After the tone arm 10 has swung again over the record by reason of the engagement of the needle with the groove of the record tablet, the stud 80 will again come into engagement with the finger 89 and moving it slightly will trip the braking mechanism and stop further rotation of the turntable. The engagement of the stud 80 with the finger 90 whenever the swinging arm 10 is moved outwardly to a position in which the stylus is outside of the outermost convolution of the record tablet, is for the purpose of moving the inner finger 89 to a position in which it must be engaged by the stud 80, as the arm 10 is swung inwardly, before the stylus is in registration with the inner end of the record groove, thus enabling the operator to always set the device by the arm 10 to operate at the end of the reproduction of sound of any selected record if he so desires, irrespective of the diameter of the inner convolution of the record groove.

The other way of setting of the mechanism may be employed when the lever 88 is in such a position that the finger 89 would not be engaged by the stud 80 when the stylus is in the innermost convolution of the sound record groove. The mechanism may then be set so that it will operate automatically at the end of the reproduction of sound from a particular record tablet by swinging the arm 10 to bring the stylus into alinement with the innermost convolution and then swinging the outer finger 90 outwardly to move the lever 88 outwardly until the finger 89 is brought in engagement with the stud 80. After that the stylus is placed in the outer convolution and the brake pad 30 moved out of engagement with the turntable.

As shown in Figs. 7 and 8 of the drawings, the automatic features of the brake may be omitted from the brake hereinbefore described, without otherwise changing the construction or mode of operation of the brake, and the invention may thus be applied to provide a simple and effective non-automatic brake.

In this modified form of the invention, the brake is practically identical with that hereinbefore described, except that the automatic features have been omitted, and the base plate 15 reduced in size accordingly. Since the stops provided in the automatic construction by the upturned portion 60 of the base plate have been removed, other stops, such, as for instance, two pins or lugs 107 are arranged rigid with the base plate 15 and upon opposite sides of the inner end of the hand-lever 88, to limit the motion of movement of the hand-lever. It is thought that a further detailed description of the construction and mode of operation of this modified form of the invention is not necessary, as all of the parts are numbered and have been fully described hereinbefore in describing the automatic form of the brake.

In Figs. 9 and 10 is shown a modified construction for imparting motion from the swinging tone arm 10 to the mechanism for releasing the brake automatically. This mechanism is similar to that illustrated in Figs. 2 and 7 of the drawings, but in this form of the device, the fingers 89' and 90' of the arm 88' are arranged substantially vertical instead of horizontal, and are mounted firmly upon the rock-shaft 20. In this form of the device, a disk 107' is securely fastened or attached to the rock-shaft 20, as by a pin 108', extending through a flange or hub 109' on said disk 107', and through said rock-shaft 20. Adjacent this disk 107', which is provided with a plane face, is arranged the friction washer 91' loose on the shaft 20, and adjacent this washer 91' is the arm 88', also loose on the shaft 20. Adjacent and beyond said arm 88' is the other washer 92', which is clamped or pressed against the arm 88' by the arms 95' of the yielding spider 94', which, in turn, may be held in a predetermined position by a nut 96' threaded over the end of the rock-shaft 20, and prevented from accidental turning or displacement in any suitable manner, as by a check-nut 110'.

In applying this invention, it is obvious that various modifications might be made to meet various conditions, that many changes might be made in the constructions hereinbefore described, and that the improved brake forming the subject-matter of this application might be used in connection with various other machines besides the talking machine, any or all of which being possible without departing from the spirit of this invention or the scope of the appended claims.

Having thus fully described this invention, I claim and desire to protect by Letters Patent of the United States:

1. A brake comprising frictional stopping means, means for moving said stopping means into initial operative position, and means coöperating with said second mentioned means for automatically and gradually applying the braking pressure of said stopping means after it has reached said position.

2. A brake comprising frictional stopping means, means for moving said stopping means into an initial operative position, said means including a toggle joint, and yielding means surrounding one member of said joint for automatically applying the braking pressure of said stopping means after it has reached said position.

3. A brake comprising a frictional brake member, yielding means for moving said brake member into initial operative position, and means actuated by said yielding means to modify the braking pressure of said brake member after it has reached its initial braking position.

4. A brake comprising a frictional brake member, yielding actuating means for moving said brake member into initial operative position, and secondary yielding means actuated by said first mentioned yielding means for modifying the pressure of said brake member after it has reached said initial position.

5. A brake comprising two links connected to form a toggle joint, a brake-shoe carried by one of said links, a spiral spring surrounding the other of said links, said other link being longitudinally movable, and means for actuating said joint to apply said brake-shoe, said spring being arranged to be compressed by the movement of said toggle joint after said shoe has been applied, to gradually apply the braking pressure of said shoe.

6. A brake comprising a brake member, a catch to hold said brake member in inoperative position, and means restrained to swing in a fixed plane only, to release said brake member from inoperative position, said means being movable also to return said brake member to an inoperative position, where it will be retained by said catch.

7. A brake, comprising an actuating lever pivoted on a fixed axis intermediate of its ends, a secondary lever pivoted coaxially with said actuating lever, a brake member operatively connected to said secondary lever, a yielding catch adapted to engage said secondary lever to hold said brake member in inoperative position, and means for automatically actuating said secondary lever when released to apply said brake member, said actuating lever being operable to release said secondary lever from said catch, and also to return said secondary lever into inoperative position, where it will be automatically retained by said catch.

8. A brake comprising an actuating lever pivoted intermediate of its ends on a fixed axis, an arm pivoted coaxially with said lever, a brake member operatively connected to said arm, a link pivoted to said arm, a second link, a pivot connecting said links to substantially form a toggle joint, a bearing in which said second link is slidable substantially longitudinally, yielding means acting longitudinally of said second link for controlling the movement thereof, and an intermediate link having one end operatively connected to said toggle joint and its other end operatively connected to said actuating lever.

9. A brake, comprising an actuating lever, a secondary lever coöperating with said actuating lever, a brake-shoe, a catch arranged to engage said secondary lever to hold said shoe in inoperative position, and means for automatically actuating said secondary lever when released to apply said brake-shoe, said actuating lever being operable to release said secondary lever from said catch, and also to return said secondary lever into inoperative position, where it will be retained by said catch.

10. A brake mechanism comprising a toggle joint consisting of two relatively movable links and a pivot connecting said links, a brake-shoe operatively connected to one of said links, a stationary support for the other of said links, yielding means acting on said stationary means and on said other of said links tending to move said pivot of said toggle joint away from said support, and means acting on said pivot of said toggle to bring said shoe into braking position, said yielding means acting on said shoe after said shoe is in braking position to gradually apply the brake pressure on said shoe.

11. A brake comprising two links connected to form a toggle joint, a brake shoe operatively connected to one of said links, yielding means surrounding the other of said links for exerting a pressure longitudinally thereof, said latter link being longitudinally movable, and means for substantially straightening said joint to apply said brake shoe.

12. A brake comprising frictional stopping means, a catch for holding said stopping means in inoperative position, means for moving said stopping means into initial operative position upon the release of said catch, and means actuated by said second mentioned means for gradually modifying the brake pressure of said stopping means after it has reached said initial operative position.

13. A brake comprising a brake-shoe, a catch to hold said brake-shoe in inoperative position, and means having a limited free movement independent of said brake-shoe to operate said catch to release said shoe from inoperative position, said means being movable also to return said brake-shoe to an inoperative position in which it is automatically engaged by said catch.

14. In a brake mechanism, the combination with a rotary element, of a brake-shoe arranged to engage said element, means for moving said brake-shoe into engagement with said element, and resilient means compressed by the movement of said first mentioned means and acting to gradually apply the pressure of said brake-shoe against said element after said brake-shoe has been brought into engagement with said element.

15. A brake comprising two links connected to form a toggle joint, a brake-shoe operatively connected to one of said links, a bearing for the other of said links, yielding means acting on said other link and tending to hold said toggle in its broken position, and means to straighten said toggle against the action of said yielding means to bring said shoe into braking position.

16. In a brake, the combination of a brake member, a movable element operatively connected to said brake member, means acting on said element for moving said brake member to an operative position, means, including a catch element, for holding said brake member in an inoperative position, one of said elements being provided with a slot having a recess providing an internal shoulder, and the other of said elements coöperating with said slot and being engaged by said shoulder to hold the brake member in an inoperative position, and means for operating said catch element to release the brake member.

17. A brake comprising a brake member, a catch to hold said brake member in inopperative position, means to release said brake from inoperative position, said means being movable also to return said brake member to an inoperative position in which it is retained by said catch, and means to release said catch independent of said first-mentioned means.

18. A brake comprising an actuating lever, a secondary lever coöperating with said actuating lever, a brake shoe, a catch arranged to engage said secondary lever to hold said shoe in inoperative position, means for automatically actuating said secondary lever when released to apply said brake shoe, said actuating lever being operable to release said secondary lever from said catch and also to return said secondary lever into inoperative position where it will be retained by said catch, and means to release said secondary lever from said catch independently of said actuating lever.

19. A brake comprising a brake shoe, a catch to hold said brake shoe in inoperative position, means having a limited free movement independent of said brake shoe to operate said catch to release said shoe from inoperative position, said means being movable also to return said brake shoe to an inoperative position in which it is automatically engaged by said catch, and means independent of said first-mentioned means to operate said catch to release said shoe from inoperative position.

20. In a brake mechanism, the combination of a movable brake member, an actuating lever pivoted upon a fixed axis, a secondary lever pivoted upon a fixed axis, said actuating lever being provided with a slot, means movable in said slot and operatively connected to said secondary lever for actuating said brake member, a yielding catch adapted to engage said secondary lever to hold said brake member in inoperative position, and means for actuating said secondary lever when released from said catch, the slot in said actuating member permitting a limited movement of said actuating lever with respect to said secondary lever to release said catch from said secondary lever.

In witness whereof, I have hereunto set my hand this 27th day of July, A. D., 1911.

WILBURN N. DENNISON.

Witnesses:
FRANK B. MIDDLETON, Jr.,
CHARLES F. VILLARD.